Feb. 25, 1964
J. S. HICKMAN
3,122,170
BAFFLE CONSTRUCTION
Filed July 11, 1962
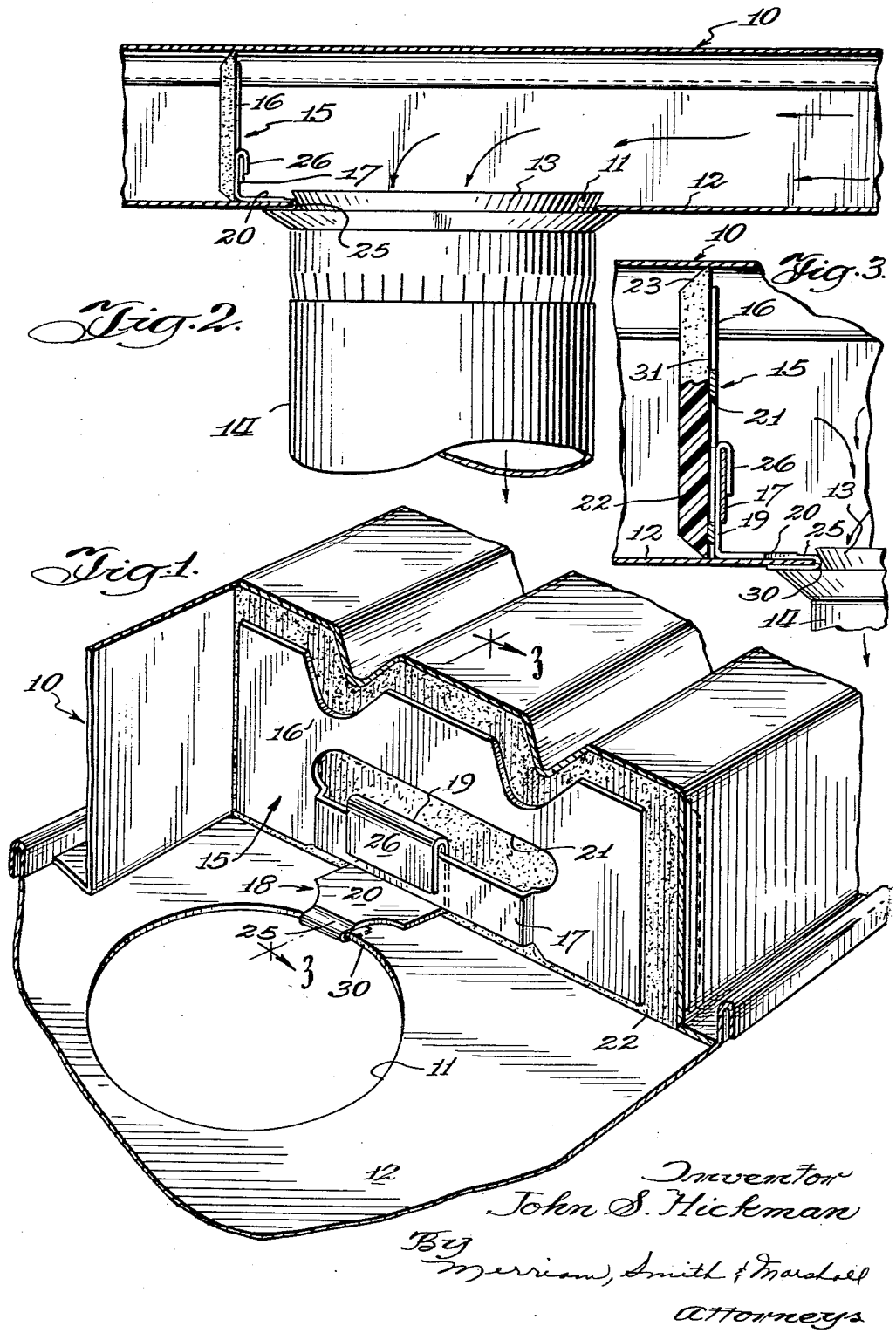
Inventor
John S. Hickman
By
Merriam, Smith & Marshall
Attorneys "# United States Patent Office 3,122,170
Patented Feb. 25, 1964

3,122,170
BAFFLE CONSTRUCTION
John S. Hickman, Shorewood, Wis., assignor to Inland Steel Products Company, Milwaukee, Wis., a corporation of Delaware
Filed July 11, 1962, Ser. No. 209,185
13 Claims. (Cl. 138—37)

The present invention relates generally to baffles used in fluid-transmitting ducts, such as heating and ventilating ducts, and more particularly to a mechanical-locking, self-aligning baffle for insertion in a duct adjacent an opening in the side wall of the duct.

Baffles are generally placed in fluid-transmitting ducts, downstream of an opening in the side wall of the duct, to close the duct and block passage of fluid through the duct past the opening and to deflect fluid through the opening. Such baffles are generally positioned in the duct by pushing them from an upstream open end of the duct downstream to the desired position adjacent the opening and then locking these baffles in place, e.g. by welding.

The present invention relates to a baffle including means for mechanically locking the baffle in a desired centered position adjacent the duct opening and aligned perpendicular to the axis of the duct. Essentially, the subject baffle means includes a plate or rigid member, a relatively wide struck-out portion extending forwardly from the plate, a locking member composed of strip-like material and including a pair of mutually perpendicular hook portions, a relatively narrow first hook portion including means for laterally slidably engaging the struck-out portion on the plate with said hook portion generally parallel to the plate, and a second hook portion including means for engaging the edge of the opening.

Duct openings are field cut and will frequently be displaced from the centerline of the duct wall by an inch or so. For proper alignment of the baffle it is essential that the second hook portion engage the edge of the opening at the point on the edge which is furthest downstream. When the opening is displaced from the duct centerline, a hook portion capable of engaging the furthest downstream point of the opening's edge must also be displaced from the duct centerline.

The construction of the subject baffle enables the second hook portion to engage the opening at the desired location while the baffle plate is centered in perpendicular alignment with the axis of the duct. This is accomplished by the lateral slidable engagement of the first hook portion with the struck-out portion. A person assembling the baffle in the duct need only slide the locking means laterally to align it with the off-center opening, and then push the entire baffle downstream into position. When the second hook portion engages the furthest downstream point on the opening's edge, the baffle is automatically located in the desired aligned, centered position.

In its locked position, the second hook portion extends parallel to the axis of the duct. Because of this and because of the mutual perpendicularity of the two hook portions, the baffle means is maintained in the desired correctly aligned position perpendicular to the axis of the duct.

As an additional feature, the second hook portion of the locking member has a reduced thickness to facilitate a tight fit of another duct member having a terminal portion extending through the opening, as will be described in more detail subsequently.

The first hook portion is constructed to engage the struck-out portion with the hook portion having substantial vertical play, which facilitates installation of the baffle in the duct.

The baffle means of the subject invention also includes a relatively flexible member composed of rubber-like material attached to the back or downstream surface of the plate and acting as a closure for the duct. The flexible member has an outer periphery which exceeds the inner dimensions of the duct when the latter is in an expanded condition due to the transmission of hot fluid therethrough. This prevents leakage of fluid around the periphery of the baffle when the duct has expanded due to heat.

In addition, the flexible member has edges beveled outwardly in an upstream direction. As a result, the flexible member provides a wiping sealing action when the baffle means is inserted into position, and the bending stresses on the edge portions of the flexible member are reduced relative to those which would occur if the edges were not so beveled.

Other features and advantages are inherent in the structure claimed and disclosed, or will become apparent to those skilled in the art from the following detailed description in conjunction with the accompanying diagrammatic drawings, wherein:

FIGURE 1 is an enlarged fragmentary perspective view, partially cut away, illustrating a duct including an embodiment of baffle means constructed in accordance with the present invention;

FIGURE 2 is a side elevational view, partially in section, of a duct system including the baffle means of FIGURE 1; and FIGURE 3 is a sectional view taken along line 3—3 in FIGURE 1.

Referring to the figures, there is shown a duct 10 including an opening 11 in the side wall 12 of the duct. Positioned adjacent opening 11 and downstream thereof is baffle means 15 for stopping the flow of fluid through duct 10 downstream of opening 11 and for deflecting the fluid through opening 11. Opening 11 receives the terminal portion 13 of a conduit 14 into which the fluid is deflected by baffle 15.

Referring to FIGURES 1 and 3, baffle 15 comprises a plate or relatively rigid member 16 including a relatively wide struck-out portion 17 extending forwardly from plate 16. Attached to the plate back or downstream surface 31 (FIGURE 3) is a relatively flexible member or closing means 23, to be described subsequently in detail.

Baffle means 15 is maintained in the desired position, perpendicular to the axis of duct 10, by a locking member indicated generally at 18 and composed of substantially flat strip material. Locking member 18 includes a pair of mutually perpendicular hook portions 19, 20.

The relatively narrow first hook portion 19 includes means 26 for engaging struck-out portion 17, said hook portion 19 extending under, then behind and then over the front of the struck-out portion, with the hook portion's engaging means 26 generally parallel to plate 16. Hook portion 19 is laterally slidably mounted on struck-out portion 17, and the engagement of portions 17, 19 permits substantial vertical play or movement by portion 19 during baffle installation which play facilitates said installation.

The second hook portion 20 of locking member 18 includes means 25 for engaging the downstream edge portion 30 of opening 11, with hook portion 20 generally parallel to the axis of duct 10. Engaging means 25 is of reduced thickness compared to the thickness of the rest of the locking member. This facilitates a tighter engagement between the edges of opening 11 and the outer surface of terminal portion 13 on conduit 14 (FIGURE 3). If engaging means 25 were not of reduced thickness, it would keep the adjacent outer surface of terminal portion 13 spaced a relatively large distance away from the opening's adjacent downstream edge portion 30, thereby leaving an undesirable leak-causing gap between terminal portion 13 and opening 11.

Baffle means 15 is inserted into a position adjacent to and downstream of opening 11 by introducing it into the duct 10 at an open end thereof (not shown) upstream of opening 11 (to the left in FIGURE 2), and then pushing the baffle means downstream until engaging means 25 on locking member 18 engages downstream edge portion 30 on opening 11 at the furthest downstream point. As previously indicated, hook portion 20 may be laterally adjusted into alignment with an off-center opening. Because of this and because hook portion 19 is generally parallel to plate 16, and hook portion 20 is parallel to the axis of duct 10, and the hook portions are mutually perpendicular, the engagement of opening edge portion 30 by hook portion 20 automatically positions baffle means 15 in the desired centered aligned position perpendicular to the axis of duct 10.

Flexible member 22 is composed of rubber or like material. The periphery of member 22 follows the contour of the inner surface of conduit 10, and slightly exceeds the inner dimensions of conduit 10 when the latter is in an expanded condition due to the transmission of heated fluid therethrough. Accordingly, there can be no leakage of fluid around the periphery of member 22 whether the conduit is expanded or contracted. Member 22 thus effectively closes duct 10 against transmission of fluid downstream of opening 11.

Flexible member 22 includes a peripheral surface 23 beveled outwardly from rearward to forward surfaces or in an upstream direction. As baffle means 15 is pushed downstream and positioned, beveled surface 23 is bent in an upstream direction and wipingly seals the inner surface of the conduit.

Providing member 22 with beveled edges 23 also reduces stresses, at the edge portions of the member, resulting from the above-described bending. In the absence of beveled edges, the stresses would be of an undesirably high magnitude.

The embodiment shown in the figures includes an opening 21 in plate 16. This opening is optional, and may be deleted if desired. The function of this opening is to accommodate up and down movement of locking member 26 whenever such movement may occur.

The foregoing detailed description has been given for clearness of understanding only, and no unnecessary limitations should be understood therefrom, as modifications will be obvious to those skilled in the art.

What is claimed is:
1. In combination:
a duct for transmitting fluids;
an opening in a side wall of said duct;
and baffle means in said duct adjacent said opening;
said baffle means comprising:
a plate;
a relatively wide struck-out portion extending forwardly from said plate;
a locking member constructed of flat strip material and having a relatively narrow first hook portion including means for laterally slidably engaging the struck-out portion;
a second hook portion, on said locking member, integral with and extending forwardly from the first hook portion;
said second hook portion including means for engaging the edge of said duct opening;
and means composed of flexible rubber-like material, attached to the back surface of said plate, for closing said duct.

2. A combination as recited in claim 1 wherein:
said first hook portion extends from the second hook portion under the struck-out portion, then behind the struck-out portion and then over the front of the struck-out portion.

3. A combination as recited in claim 1 wherein:
said first hook portion is generally parallel to said plate;
said second hook portion is parallel to the axis of said duct;
and said second hook portion is substantially perpendicular to said first hook portion.

4. A combination as recited in claim 1 wherein:
said engaging means on the second hook portion is of reduced thickness compared to the thickness of the rest of the locking member.

5. A combination as recited in claim 1 wherein:
the periphery of said flexible rubber-like closing means exceeds the inner dimensions of the duct when the latter is in an expanded condition due to the transmission of heated fluids therethrough.

6. A combination as recited in claim 1 wherein:
the periphery of said flexible rubber-like closing means is beveled outwardly from the rearward to forward surfaces of the closing means.

7. Baffle means for insertion in a fluid-transmitting duct adjacent an opening in a side wall of the duct, said baffle means comprising:
a plate;
a relatively wide struck-out portion extending forwardly from said plate;
a locking member constructed of flat strip material and having a relatively narrow first hook portion including means for laterally slidably engaging the struck-out portion;
a second hook portion, on said locking member, integral with and extending forwardly from the first hook portion;
said second hook portion including means for engaging the edge of said opening;
and means composed of flexible rubber-like material, attached to the back surface of said plate, for closing said duct.

8. A baffle as recited in claim 7 wherein:
said first hook portion extends from the second hook portion under the struck-out portion, then behind the struck-out portion and then over the front of the struck-out portion;
and said first hook portion is generally parallel to said plate.

9. A baffle as recited in claim 7 wherein:
said second hook portion is substantially perpendicular to said first hook portion;
and said engaging means on the second hook portion is of reduced thickness compared to the thickness of the rest of the locking member.

10. A baffle as recited in claim 7 wherein:
the periphery of said flexible rubber-like closing means exceeds the inner dimensions of the duct when the latter is in an expanded condition due to the transmission of heated fluids therethrough.

11. A baffle as recited in claim 7 wherein:
the periphery of said flexible rubber-like closing means is beveled outwardly from the rearward to forward surfaces of the closing means.

12. Baffle means for insertion in a fluid-transmitting duct adjacent an opening in a side wall of the duct, said baffle means comprising:
a relatively rigid member;
a relatively flexible member attached to the back surface of said rigid member;
a relatively wide struck-out portion extending forwardly from said rigid member;
a locking member constructed of flat strip material and having a relatively narrow first hook portion including means for laterally slidably engaging the struck-out portion;
a second hook portion, on said locking member, integral with and extending forwardly from the first hook portion;

said second hook portion including means for engaging the edge of said opening;
said engaging means on the second hook portion being of reduced thickness compared to the thickness of the rest of the locking member;
the periphery of said flexible member exceeding the inner dimensions of the duct when the latter is in an expanded condition due to the transmission of heated fluids therethrough;
the periphery of said flexible member being beveled outwardly from the rearward to forward surfaces of the closing means.

13. Baffle means as recited in claim 12 wherein:
said second hook portion is substantially perpendicular to said first hook portion;
said first hook portion extends from the second hook portion under the struck-out portion, then behind the struck-out portion and then over the front of the struck-out portion;
and the first hook portion is generally parallel to the plate.

References Cited in the file of this patent

UNITED STATES PATENTS

| | | |
|---|---|---|
| 1,228,023 | Huyette | May 29, 1917 |
| 2,746,406 | Kargala | May 22, 1956 |